(12) United States Patent
Nishikawa

(10) Patent No.: US 11,845,872 B2
(45) Date of Patent: Dec. 19, 2023

(54) DISPERSION COMPOSITION, DISPERSION AND INK COMPOSITION, AND METHOD OF PRODUCING THE SAME

(71) Applicant: Nissin Chemical Industry Co., Ltd., Echizen (JP)

(72) Inventor: Tomoyuki Nishikawa, Echizen (JP)

(73) Assignee: NISSIN CHEMICAL INDUSTRY CO., LTD., Echizen (JP)

( * ) Notice: Subject to any disclaimer, the term of this patent is extended or adjusted under 35 U.S.C. 154(b) by 0 days.

(21) Appl. No.: 17/869,373

(22) Filed: Jul. 20, 2022

(65) Prior Publication Data

US 2022/0372317 A1 Nov. 24, 2022

Related U.S. Application Data

(62) Division of application No. 16/552,154, filed on Aug. 27, 2019, now Pat. No. 11,542,403.

(30) Foreign Application Priority Data

Aug. 29, 2018 (JP) .................................. 2018-160358

(51) Int. Cl.
| | | |
|---|---|---|
| *C09D 11/326* | (2014.01) | |
| *C09D 11/38* | (2014.01) | |
| *C09D 11/328* | (2014.01) | |
| *C09D 11/102* | (2014.01) | |
| *C09D 11/037* | (2014.01) | |
| *C09D 11/033* | (2014.01) | |
| *C09K 23/38* | (2022.01) | |

(52) U.S. Cl.
CPC .......... *C09D 11/326* (2013.01); *C09D 11/033* (2013.01); *C09D 11/037* (2013.01); *C09D 11/102* (2013.01); *C09D 11/328* (2013.01); *C09D 11/38* (2013.01); *C09K 23/38* (2022.01)

(58) Field of Classification Search
CPC ..... C09D 11/38; C09D 11/033; C09D 11/037; C09D 11/102; C09D 11/328; C09D 11/326; C09K 23/38
See application file for complete search history.

(56) References Cited

U.S. PATENT DOCUMENTS

| | | | |
|---|---|---|---|
| 5,385,655 A * | 1/1995 | Brent ..................... | B05D 7/578 204/488 |
| 2003/0078307 A1 | 4/2003 | Shinohara et al. | |
| 2008/0063892 A1 | 3/2008 | Mizusaki et al. | |
| 2018/0118961 A1 | 5/2018 | Nishikawa | |
| 2020/0071555 A1* | 3/2020 | Nishikawa ............ | C09B 69/109 |

FOREIGN PATENT DOCUMENTS

| | | |
|---|---|---|
| EP | 1897924 A1 | 3/2008 |
| JP | 2000-239980 A | 9/2000 |
| JP | 2004-290839 A | 10/2004 |
| JP | 2005-154912 A | 6/2005 |
| JP | 2007-224210 A | 9/2007 |
| JP | 2008-38075 A | 2/2008 |
| JP | 2010-111826 A | 5/2010 |
| JP | 2013-144791 A | 7/2013 |
| JP | 2016-60772 A | 4/2016 |
| JP | 2018-53035 A | 4/2018 |
| JP | 2003-49394 A | 2/2023 |

OTHER PUBLICATIONS

Extended European Search Report dated Jan. 24, 2020, issued in counterpart application No. 19192355.6. (6 pages).
English machine translation of JP 2005-154912. (Year: 2005).
Office Action dated Mar. 23, 2022, issued in counterpart Chinese application No. 201910805895.9, with English translation. (14 pages).
Office Action dated Jul. 7, 2022, issued in counterpart EP application No. 19 192 355.6. (13 pages).

* cited by examiner

*Primary Examiner* — John E Uselding
(74) *Attorney, Agent, or Firm* — WHDA, LLP

(57) ABSTRACT

There are provided a dispersion composition containing: (A) from 85 to 99.89% by weight of a dispersant (except for the following (B) and (C)); (B) from 0.01 to 5% by weight of an acetylene glycol and/or an acetylene glycol ethoxylate; and (C) from 0.1 to 10% by weight of one or two or more types selected from polyoxy (ethylene-propylene) block polymers having a weight average molecular weight of from 1,500 to 20,000, a content of ethylene oxide of from 20 to 90% by weight, and a content of propylene oxide of from 10 to 80% by weight: a dispersion and an ink composition using the same, and a method of producing the same.

5 Claims, No Drawings

DISPERSION COMPOSITION, DISPERSION AND INK COMPOSITION, AND METHOD OF PRODUCING THE SAME

CROSS-REFERENCE TO RELATED APPLICATION

This application is a divisional of U.S. Application Ser. No. 16/552,154 filed on Aug. 27, 2019, which claims priority of Japanese Application No. 2018-160358 filed in Japan on Aug. 29, 2018, the entire contents of which are hereby incorporated by reference.

TECHNICAL FIELD

The present invention relates to a dispersion composition, and more particularly, to a dispersion composition used for dispersing a disperse dye or pigment, a dispersion and an ink composition, and to a method of producing the same.

BACKGROUND ART A disperse dye or pigment has hitherto been used as colorants for ink. When the disperse dye or pigment is used in ink, it is necessary to disperse a micronized disperse dye or pigment in water. However, the disperse dye or pigment is insoluble in water, so the dispersant is important for rendering the disperse dye or pigment into a dispersed state and stably maintaining that dispersed state for a prolonged period of time. Meanwhile, in recent years, it has been desired to reduce a particle size of the disperse dye or pigment in order to improve fineness of an image, and various dispersion methods and dispersion process conditions have been proposed to reduce the particle size. However, if the disperse dye or pigment is not finely and stably dispersed in a medium, an excellent transparency, fineness and color developability are not obtained, and in ink for an ink jet, clogging of nozzles is caused. However, in general, there is a practical limit to the degree of micronization by mechanical pulverizing and dispersion of the disperse dye or pigment.

Heretofore, various compounds have been used as the dispersant. For example, in Patent Document 1, aromatic sulfonates and lignin sulfonates are used as the dispersant for a disperse dye. In addition, in Patent Document 2, a styrene-acrylic acid copolymer, a styrene-methacrylic acid copolymer, a styrene-maleic acid copolymer, a sodium naphthalene sulfonate formalin condensate, or the like is used as a high molecular weight dispersant.

However, in the inks containing the disperse dye or pigment dispersion obtained by using the dispersant, the dispersant is a high molecular weight resin or surfactant, and thus the average particle size of the disperse dye or pigment is large, and ejection stability or liquid stability is poor.

Accordingly, a method of using a plurality of dispersants has also been attempted. For example, Patent Document 3 describes, as a dispersant, the blended use of polyoxyethylene-β-naphthyl ether, which is a nonionic surfactant, and a sodium naphthalene sulfonate formalin condensate, which is an anionic surfactant. In addition, Patent Document 4 discloses a pigment dispersion containing two or more selected from a sodium naphthalene sulfonate formalin condensate, a polycarboxylic acid graft polymer, and polyoxyethylene styryl phenyl ether.

In addition, a method of using a dispersant and a surfactant in combination has also been attempted. For example, Patent Document 5 discloses that a dispersant and two or more surfactants are used in combination. Patent Document 6 discloses a composition containing a dispersant, a sulfate ester-based surfactant, and an acetylene glycol-based surfactant having an HLB value of 6.0 or less. However, in either case, the ability to micronize the disperse dye or pigment is poor, and the dispersion performance has room for improvement.

CITATION LIST

Patent Document 1: JP-A 2000-239980
Patent Document 2: JP-A 2007-224210
Patent Document 3: JP-A 2008-038075
Patent Document 4: JP-A 2010-111826
Patent Document 5: JP-A 2016-060772
Patent Document 6: JP-A 2018-053035

SUMMARY OF THE INVENTION

The present invention has been made in view of the above circumstances, and it is an object of the present invention to provide a dispersion composition, a dispersion and an ink composition using the same, which are capable of atomizing disperse dye or pigment and having further excellent wettability and dispersion stability, and a method of producing the same.

As a result of intensive studies in order to achieve the above object, the inventors made the discovery that when a dispersion composition in which a dispersant, an acetylene glycol-based surfactant represented by the following formula (1) and/or the following formula (2), and polyoxy (ethylene-propylene) block polymers having a specific number of added moles of ethylene oxide and molecular weight range are blended, is used, the disperse dye or pigment may be micronized, and further excellent wettability and dispersion stability may be obtained, and thus the present invention has been completed.

Therefore, the present invention provides the following dispersion composition, a dispersion and an ink composition using the same, and a method of producing the same.

1. A dispersion composition comprising:
(A) from 85 to 99.89% by weight of a dispersant (except for the following (B) and (C));
(B) from 0.01 to 5% by weight of an acetylene glycol represented by the following formula (1) and/or an acetylene glycol ethoxylate represented by the following formula (2); and

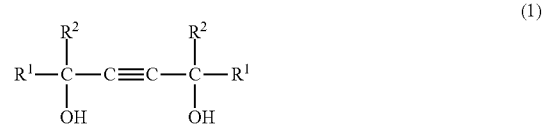

wherein $R^1$ and $R^2$ each represent an alkyl group having 1 to 5 carbon atoms.

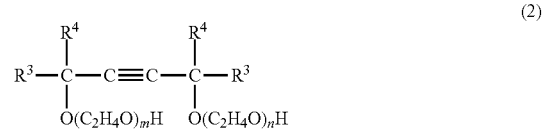

wherein $R^3$ and $R^4$ each represent an alkyl group having 1 to 5 carbon atoms, m and n are each a positive number of from 0.5 to 25, and m+n is from 1 to 40;

(C) 0.1 to 10% by weight of one or two or more types selected from polyoxy (ethylene-propylene) block polymers represented by the following formula (3) and having a weight average molecular weight of from 1,500 to 20,000, a content of ethylene oxide of from 20 to 90% by weight, and a content of propylene oxide of from 10 to 80% by weight:

$$HO(C_2H_4O)_w(C_3H_6O)_x(C_2H_4O)_yH \quad (3)$$

wherein w, x, and y are positive numbers.

2. The dispersion composition described in the above 1, wherein the weight average molecular weight of the dispersant of component (A) is 100 or more.
3. The dispersion composition described in the above 1, wherein in (C) the polyoxy (ethylene-propylene) block polymers, the content of ethylene oxide is from 35 to 90% by weight, and the content of propylene oxide is from 10 to 65% by weight.
4. The dispersion composition described in the above 1, wherein the (C) polyoxy (ethylene-propylene) block polymers have a weight average molecular weight of from 5,000 to 20,000.
5. A dispersion comprising:
   the dispersion composition described in the above 1;
   a disperse dye and/or pigment; and
   an aqueous solvent.
6. An ink composition comprising the dispersion described in the above 5.
7. A method of producing a dispersion comprising mixing and dispersing the dispersion composition in the above 1, a disperse dye and/or pigment, and an aqueous solvent.
8. A method of producing an ink composition, the method comprising:
   obtaining a dispersion by mixing and dispersing the dispersion composition described in the above 1, a disperse dye and/or pigment, and an aqueous solvent; and
   mixing the dispersion with at least one substance selected from the group consisting of water, a water-soluble organic solvent, a resin, an ultraviolet absorber, an antioxidant, a pH adjuster, a preservative, and a viscosity modifier.

Advantageous Effects of the Invention

According to the dispersion composition of the present invention, the disperse dye or pigment may be micronized. In addition, a dispersion using this dispersion composition, and an ink composition may exhibit excellent wettability and may exhibit dispersion stability without change over time.

DESCRIPTION OF THE PREFERRED EMBODIMENT

A dispersion composition of the present invention contains:
(A) from 85 to 99.89% by weight of a dispersant (except for the following (B) and (C));
(B) from 0.01 to 5% by weight of an acetylene glycol represented by the following formula (1) and/or an acetylene glycol ethoxylate represented by the following formula (2); and

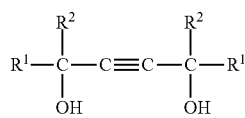

(1)

wherein $R^1$ and $R^2$ each represent an alkyl group having 1 to 5 carbon atoms.

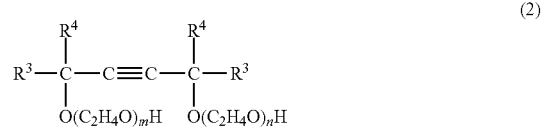

(2)

wherein $R^3$ and $R^4$ each represent an alkyl group having 1 to 5 carbon atoms, m and n are each a positive number of from 0.5 to 25, and m+n is from 1 to 40;

(C) 0.1 to 10% by weight of one or two or more selected from polyoxy (ethylene-propylene) block polymers represented by the following formula (3) and having a weight average molecular weight of from 1,500 to 20,000, a content of ethylene oxide of from 20 to 90% by weight, and a content of a propylene oxide of from 10 to 80% by weight:

$$HO(C_2H_4O)_w(C_3H_6O)_x(C_2H_4O)_yH \quad (3)$$

wherein w, x, and y are positive numbers.

The dispersant of component (A) is not particularly limited as long as it is a known dispersant except for the following (B) and (C). Examples thereof can include a high molecular weight dispersant, a low molecular weight surfactant, or the like. However, it is preferable to use the compound having a molecular weight (weight average molecular weight) of 100 or more and it is preferable to use a high molecular weight dispersant in view of storage stability of the ink. The term "low molecule" refers to a molecule (weight average molecular weight) having a molecular weight of 1,000 or less, and preferably 100 or more. The term "high molecule" refers to a molecule having a molecular weight (weight average molecular weight) exceeding 1,000, and preferably a high molecular weight dispersant having a molecular weight of from 3,000 to 20,000. The above molecular weight (weight average molecular weight) is measured in conformity to JIS K 7252. In the present invention, the dispersant preferably having weight average molecular weight of the above numeral range may be used.

Examples of the high molecular weight dispersant can include natural gums such as gum arabic and tragacanth gum, glucosides such as saponin, cellulose derivatives such as methylcellulose, carboxycellulose, and hydroxymethylcellulose, lignin sulfonate (Na, K, Ca, Mg) or a formalin condensate thereof, natural polymers such as shellac, anionic polymers such as polyacrylates, styrene-anhydride maleic copolymer, olefin-anhydride maleic copolymer, polystyrene sulfonate (Na, K), acrylamide-acrylic acid copolymer, sodium alginate, salts of styrene-acrylic acid copolymer, salts of vinyl naphthalene-maleic acid copolymer, salts of naphthalene sulfonic acid formalin condensates, or nonionic polymers such as polyvinyl alcohol, polyalkylene polyamines, poly acrylamide, polyvinyl pyrrolidone, and polyethylene glycol.

More preferably, that can include cellulose derivatives such as methylcellulose, carboxycellulose and hydroxymethylcellulose, lignin sulfonate (Na, K) or a formalin condensates, natural polymers such as shellac, polyacrylate (Na, K), styrene-anhydride maleic acid copolymer, olefin-anhydride maleic copolymer, polystyrene sulfonate (Na, K), acrylamide-acrylic acid copolymer, sodium alginate, salts of styrene-acrylic acid copolymer (Na, K), salts of vinyl naphthalene-maleic acid copolymer (Na, K), salts of naphthalene sulfonic acid formalin condensate (Na, K), polyvinyl alcohol, polyalkylene polyamines, polyacrylamide, polyvinyl pyrrolidone, or polyethylene glycol.

In addition, examples of the low molecular weight surfactant can include anionic surfactants such as carboxylate types such as carboxylate, ether carboxylate, acyl amino acid salt, etc., sulfate ester types such as sulfate ester salt, ether sulfate ester salt, amide ether sulfate ester salt, etc., sulfonate types such as sulfonate, sulfosuccinate, acyl taurate, isethionate, etc., phosphate ester salt types such as alkyl monophosphate Na salt, alkyltriphosphate Na salt, polyoxyethylene alkyl ether phosphate ester salt, di (tri) polyoxyethylene alkyl ether phosphate ester Na salt, tripolyoxyethylene alkyl ether phosphate, etc., or nonionic surfactants such as oxyethylene chain types such as ether type, ether ester type, oxyethylene chain-oxypropylene chain addition type, ethylenediamine-oxypropylene chain-oxyethylene chain addition type, hydroxyl group-containing types such as sorbitan ester, glyceride, alkyl fatty acid (mono, poly) ester of polyglycerin, polyglycerin condensed ricinoleate ester, organic acid monoglyceride, propylene glycol fatty acid ester, sucrose fatty acid esters, alkyl glyceryl ethers, alkyl polyglucosides, lecithin.

Each of these compounds may also be appropriately selected and one or two or more thereof may be used.

The blended amount of component (A) is from 85 to 99.89% by weight, and preferably from 90 to 99.8% by weight, per the total of the dispersion composition as an active ingredient. If the blended amount of component (A) is less than 85% by weight, dispersion failure of the disperse dye occurs, and if the blended amount of component (A) exceeds 99.89% by weight, generation of bubbles is increased.

Component (B) of the dispersion composition of the present invention is one or two or more of acetylene glycols selected from an acetylene glycol represented by the following formula (1) and/or an acetylene glycol ethoxylate represented by the following formula (2):

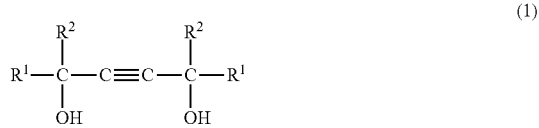

(1)

wherein $R^1$ and $R^2$ each represent an alkyl group having 1 to 5 carbon atoms.

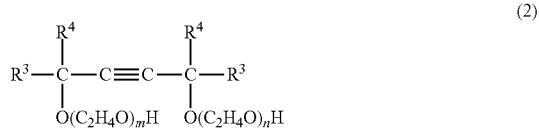

(2)

wherein $R^3$ and $R^4$ each represent an alkyl group having 1 to 5 carbon atoms, m and n are each a positive number of from 0.5 to 25, and m+n is from 1 to 40.

Here, the total number of added moles of ethylene oxide in the ethoxylate represented by formula (2) is from 1 to 40 moles, and preferably from 2 to 12 moles. If the total number of added moles of ethylene oxide exceeds 40 moles, the static and dynamic surface tension of the ink composition is increased.

These acetylene glycols which are component (B) can be used alone or in combination of two or more, and the amount used in producing the dispersion composition of the present invention is from 0.01 to 5% by weight, and preferably from 0.1 to 1% by weight. If the amount of acetylene glycols is less than 0.01% by weight, the dynamic surface tension is increased, which causes cissing at the time of high-speed printing. If the amount of acetylene glycols exceeds 5% by weight, the solubility in water is deteriorated, such that aggregates are generated at the time of blending, and the effect of reducing the surface tension cannot be obtained, resulting in cissing or remarkably deteriorated stability at a low temperature, which makes blending difficult.

The polyoxy (ethylene-propylene) block polymers of component (C) are represented by the following formula (3):

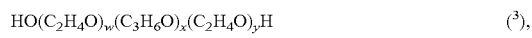

(3), wherein w, x, y are positive numbers. w+y is preferably from 10 to 200, and x is preferably from 10 to 50. Specifically, for example, the following compounds can be included, and these may be used alone or in combination of two or more:

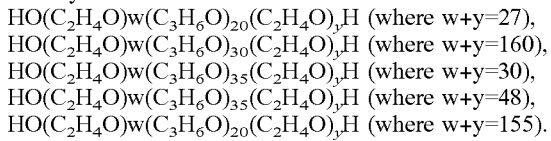

In addition, the weight average molecular weight of component (C) is from 1,500 to 20,000, and particularly preferably from 5,000 to 20,000. If the weight average molecular weight of component (C) is less than 1,500, since a solubilization ability is reduced and the solubility in water is reduced, insoluble materials are generated upon blending with ink. If the weight average molecular weight of component (C) exceeds 20,000, the dynamic surface tension is large, which causes bleeding at the time of printing. In addition, the weight average molecular weight is a value measured by gel permeation chromatography (GPC).

In addition, the content of ethylene oxide is from 20 to 90% by weight, and particularly preferably from 35 to 90% by weight. If the content of ethylene oxide is less than 20% by weight, the solubilization ability is reduced and aggregates are generated. If the content of ethylene oxide exceeds 90% by weight, the solubilization ability is increased, but the dynamic surface tension is increased, resulting in cissing at the time of high speed coating.

The content of propylene oxide is also from 10 to 80% by weight, and more preferably from 10 to 65% by weight. It is more preferable that the content of ethylene oxide is higher than that of propylene oxide.

The amount of component (C) used in producing the dispersion composition of the present invention is from 0.1 to 10% by weight, and preferably from 0.5 to 5% by weight. If the amount of component (C) is less than 0.1% by weight, sufficient solubilization of component (B) is not achieved and water solubility is lowered, resulting in aggregates upon blending. If the amount of component (C) exceeds 10% by weight, upon blending, a lot of bubbles are generated or dynamic surface tension is increased, resulting in unevenness of coating or cissing.

The dispersion composition of the present invention contains components (A), (B), and (C), and has a composition of (A)+(B)+(C)=100% by weight.

The dispersion of the present invention contains the dispersion composition as described above, a disperse dye and/or pigment, and an aqueous solvent, and is particularly preferably used as an ink composition.

The constituent ingredients of the dispersion are described below.

In the dispersion of the present invention, the blended amount of the dispersion composition is preferably from 1 to 100 parts by weight, more preferably from 10 to 90 parts by weight, and further preferably from 30 to 80 parts by weight, per 100 parts by weight of the disperse dye and pigment as an active ingredient. If the blended amount of the dispersing composition is too small, the disperse dye or pigment cannot be sufficiently dispersed. In addition, if the blended amount of the dispersion composition is too large, a large amount of the dispersant not adsorbed to the disperse dye or pigment is present in the dispersion, which is not preferable.

Known disperse dyes can be used without particular limitation as the disperse dye. The disperse dyes are compounds which are classified by chemical structures, such as benzene azo structures (monoazo, disazo), heterocyclic azo structures (thiazole azo, benzothiazole azo, pyridone azo, pyrazolone azo, thiophene azo, etc.), anthraquinone structures, and condensed structures (quinophthalone, styryl, coumarin, etc.), and which have characteristics such as a poor solubility in water because they lack water-soluble groups and have a molecular weight of 2,000 or less, which is small compared to other dyes.

Examples of disperse dyes that can be preferably used in the present invention include the following:

yellow dyes such as C. I. Disperse Yellow 3, 4, 5, 7, 9, 13, 24, 30, 33, 34, 42, 44, 49, 50, 51, 54, 56, 58, 60, 63, 64, 66, 68, 71, 74, 76, 79, 82, 83, 85, 86, 88, 90, 91, 93, 98, 99, 100, 104, 114, 116, 118, 119, 122, 124, 126, 135, 140, 141, 149, 160, 162, 163, 164, 165, 179, 180, 182, 183, 186, 192, 198, 199, 202, 204, 210, 211, 215, 216, 218, and 224;

orange dyes such as C. I. Disperse Orange 1, 3, 5, 7, 11, 13, 17, 20, 21, 25, 29, 30, 31, 32, 33, 37, 38, 42, 43, 44, 45, 47, 48, 49, 50, 53, 54, 55, 56, 57, 58, 59, 61, 66, 71, 73, 76, 78, 80, 89, 90, 91, 93, 96, 97, 119, 127, 130, 139, and 142;

red dyes such as C. I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 289, 298, 302, 303, 310, 311, 312, 320, 324, and 328;

violet dyes such as C. I. Disperse Violet 1, 4, 8, 23, 26, 27, 28, 31, 33, 35, 36, 38, 40, 43, 46, 48, 50, 51, 52, 56, 57, 59, 61, 63, 69, and 77;

green dyes such as C. I. Disperse Green 6:1, and 9;

brown dyes such as C. I. Disperse Brown 1, 2, 4, 9, 13, 19, and 27;

blue dyes such as C. I. Disperse Blue 3, 7, 9, 14, 16, 19, 20, 26, 27, 35, 43, 44, 54, 55, 56, 58, 60, 62, 64, 71, 72, 73, 75, 79, 81, 82, 83, 87, 91, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, and 360; and black dyes such as C.I. Disperse Black 1, 3, 10, and 24.

Dyes available from Nippon Kayaku Co., Ltd. that can be preferably used include Kayaset Black K-R, A-N, Kayalon Polyester Black S-200, EX-SF 300, G-SF, BR-SF, 2B-SF 200, TA-SF 200, AUL-S, Kayaset Yellow K-CL, Kayalon Polyester Yellow 4G-E, Kayalon Polyester Light Yellow 5G-S, Kayaset Red K-BL, Kayacelon Red E-BF, SMS-5, SMS-12, Kayalon Polyester Red TL-SF, BR-S, BL-E, HL-SF, 3BL-5200, AUL-S, Kayalon Polyester Light Red B-5200, Kayalon Polyester Rubine BL-5200, Kayaset Blue N, K-FL, MSB-13, Kayalon Polyester Blue BR-SF, T-S, Kayalon Polyester Light Blue BGL-5200, Kayalon Polyester Turq Blue GL-5200, Kayalon Polyester Blue Green FCT-S, or the like.

Dyes available from Orient Chemical Industries Co., Ltd. that can be preferably used include Valifast Black 3806, 3810, 3820, Oil Black BS, BY, B-85, 860, Water Yellow 6C, Valifast Yellow 1101, 1105, 3110, 3120, 4120, 4126, Oplas Yellow 130, 140, Oil Yellow GG-S, 105, 107, 129, 818, Water Red 27, Valifast Red 1306, 1355, 2303, 3311, 3320, Valifast Orange 3210, Valifast Brown 2402, Oil Red 5B, Oil Pink 312, Oil Brown BB, Valifast Blue 1601, 1603, 1605, 2606, 3806, 3820, Oil Blue #15, #613, 613, N14, BOS, or the like.

Dyes available from Sumitomo Chemical Co., Ltd. that can be preferably used include Sumikaron Black S-BL, S-BF extra conc., S-RPD, S-XE 300%, Sumikaron Yellow SE-4G, SE-5G, SE-3GL conc., SE-RPD, Sumikaron Brilliant Flavine S-10G, Sumikaron Red E-FBL, E-RPD(E), S-RPD(S), Sumikaron Brilliant Red S-BF, S-BLF, SE-BL, SE-BGL, SE-2BF, SE-3BL(N), Sumikaron Red E-FBL, E-RPD(E), S-RPD(S), Sumikaron Brilliant Red S-BF, S-BLF, SE-BL, SE-BGL, SE-2BF, SE-3BL(N), Sumikaron Brilliant Blue S-BL, Sumikaron Turquoise Blue S-GL, S-GLFgrain, or the like.

Dyes available from BASF that can be preferably used include Basacryl Black X-BGW, NaozaponBlack X-51, X-55, Neozapon Yellow 081, Lurafix Yellow 138, or the like, Zapon Blue 807, Neozapon Blue 807, Lurafix Blue590, 660, Orasol Black RLI, RL, CN, Oracet Yellow 8GF, GHS, Orasol Red G, Oracet Pink RP, Orasol Blue GL, GN, 2R, or the like.

Dyes available from Taoka Chemical Company, Limited that can be preferably used include Oleosol Fast Black AR, RL, Oleosol Fast Pink FB, Rhodamine A, B, B gran., Oleosol Fast Yellow 2G, Oleosol Fast Blue ELN, or the like.

Dyes available from Hodogaya Chemical Co., Ltd. that can be preferably used include Spilon Black BNH, MH special, or the like.

Dyes available from Mitsui Chemicals, Incorporated that can be preferably used include PS Yellow GG, MS Yellow HD-180, PS Red G, MS Magenta VP, or the like.

Dyes available from Bayer AG that can be preferably used include Ceres Blue GN 01, or the like.

Dyes available from Sumika Color Co., Ltd. that can be preferably used include TS Yellow 118 cake, ESC Yellow 155, Sumiplast Yellow HLR, GC, TS Turq Blue 618, 606, ESC Blue 655, 660, Sumiplast BlueS, OA, or the like.

Known pigments can be used without particular limitation as the pigment. Examples of organic pigments can include azo pigments such as soluble azo pigments, insoluble azo pigments, and condensed azo pigments; polycyclic pigments such as quinacridone pigments, perylene pigments, perinone pigments, isoindolinone pigments, isoindoline pigments, dioxazine pigments, thioindigo pigments, anthraquinone pigments, quinophthalone pigments, metal complex pigments, and diketo-pyrrolo-pyrrole pigments; and phthalocyanine pigments. In addition, examples of inorganic pigments can include carbon black, metal oxides, metal hydroxides, metal sulfides, metal ferrocyanides, metal chlorides, or the like. In addition, examples of carbon blacks can include furnace black, lamp black, acetylene black, channel black, or the like.

Specific examples of pigments can include red pigments such as C.I. Pigment Red 7, 9, 14, 41, 48:1, 48:2, 48:3, 48:4, 81:1, 81:2, 81:3, 122, 123, 146, 149, 168, 177, 178, 179, 187, 200, 202, 208, 210, 215, 224, 254, 255, and 264;

yellow pigments such as C.I. Pigment Yellow 1, 3, 5, 6, 14, 55, 60, 61, 62, 63, 65, 73, 74, 77, 81, 93, 97, 98, 104, 108, 110, 128, 138, 139, 147, 150, 151, 154, 155, 166, 167, 168, 170, 180, 188, 193, 194, and 213;

orange pigments such as C. I. Pigment Orange 36, 38, and 43;

blue pigments such as C. I. Pigment Blue 15, 15:2, 15:3, 15:4, 15:6, 16, 22, and 60;

green pigments such as C.I. Pigment Green 7, 36, and 58;

violet pigments such as C.I. Pigment Violet 19, 23, 32, and 50; and black pigments such as C.I. Pigment Black 7.

Of these, preferred use can be made of, for example, C.I. Pigment Red 122, C.I. Pigment Yellow 74, 128 and 155, C.I. Pigment Blue 15:3, 15:4 and 15:6, C.I. Pigment Green 7 and 36, C.I. Pigment Violet 19, and C.I. Pigment Black 7.

With regard to the disperse dye and/or pigment included in the dispersion, the type, particle size, treatment method and the like may be suitably selected according to the intended purpose thereof. In addition, the disperse dye and pigment included in the dispersion may be used alone or in combination of two or more.

The concentration of the disperse dye and pigment in the dispersion is preferably from 1 to 50% by weight, and more preferably from 5 to 40% by weight, per 100% by weight of the dispersion. If the concentration of the disperse dye and pigment exceeds 50% by weight, the density of the disperse dye and pigment in the dispersion is increased, such that free movement is disturbed. Thus, there is a possibility of aggregation.

Water and/or a water-soluble organic solvent may be used as the aqueous solvent, and two or more such solvent may be used in admixture. The water is preferably pure water or ion exchange water (deionized water). In addition, examples of water-soluble organic solvents that may be used include alcohols such as methyl alcohol, ethyl alcohol, n-propyl alcohol, isopropyl alcohol, n-butyl alcohol, sec-butyl alcohol, and tert-butyl alcohol; glycols such as ethylene glycol, propylene glycol, dipropylene glycol, butylene glycol, triethylene glycol, 1,2,6-hexanetriol, thiodiglycol, hexylene glycol, and diethylene glycol; glycol ethers such as ethylene glycol monomethyl ether, ethylene glycol monoethyl ether, diethylene glycol methyl ether, diethylene glycol ethyl ether, triethylene glycol monomethyl ether, triethylene glycol monoethyl ether, and triethylene glycol monobutyl ether; polyhydric alcohols such as glycerol; and nitrogen-containing compounds such as N-methyl-2-pyrrolidone, 2-pyrrolidone, and 1,3-dimethyl-2-imidazolidinone. In addition, in a case where a mixed solution of water and a water-soluble organic solvent is used, the ratio of the water-soluble organic solvents is 10% by weight or less, preferably from 0.01 to 5% by weight, per 100% by weight of the dispersion.

The ratio of water and a water-soluble organic solvent in the dispersion is preferably from 5 to 95% by weight, and more preferably from 30 to 90% by weight, per 100% by weight of the dispersion.

The method of producing the dispersion of the present invention preferably includes in particular mixing and dispersing the above-described dispersion composition, disperse dye and/or pigment, and aqueous solvent. For example, the dispersion can be obtained by mixing the dispersant with the disperse dye and/or pigment, and the aqueous solvent using a mixing and dispersing apparatus such as a paint shaker, bead mill, ball mill, dissolver, and kneader. Moreover, in case where ingredients that are solid at room temperature are used, they may be heated and mixed if necessary.

The dispersion has a viscosity of preferably 10.0 mPa·s or less, and more preferably 5.0 mPa·s or less. In addition, it is desirable for the lower limit in the viscosity of the dispersion to be at least 1.0 mPa·s. Here, the viscosity is measured at 25° C.

The average particle size of the disperse dye and/or pigment in the dispersion has, for example, 330 nm or less, and preferably from 100 to 300 nm, as the particle size after 5 hours of dispersion in the dispersion. "Average particle size" here refers to the median diameter (D50).

The static surface tension of the dispersion is preferably 50 mN/m or less, and more preferably 45 mN/m or less, and the lower limit is more preferably 20 mN/m or more.

In addition, the ink composition of the present invention preferably contains (i) to (iii) below:
  (i) a dispersion composition,
  (ii) a disperse dye and/or pigment, and
  (iii) a water and/or water-soluble organic solvent.

Furthermore, it is preferable to optionally add additives such as resins, ultraviolet absorbers, antioxidants, pH adjusters, preservatives, and viscosity modifiers.

The concentration of the disperse dye and/or pigment in the ink composition is preferably from 0.1 to 20% by weight, and more preferably from 0.1 to 10% by weight, per 100% by weight of the ink composition.

The ratio of water and/or the water-soluble organic solvent in the ink composition is preferably from 50 to 99% by weight, and more preferably from 60 to 95% by weight, per 100% by weight of the ink composition.

The resin contained in the ink composition is preferably a polymer having hydrophobic groups and hydrophilic groups. Such a polymer preferably has at least one functional group selected from alkyl groups, cycloalkyl groups and aryl groups, as hydrophobic groups. In addition, such a polymer preferably has at least one functional group selected from carboxyl groups, sulfo groups, hydroxyl groups, amino groups, amide groups, and functional groups thereof, as hydrophilic groups. Such a polymer can be obtained by polymerizing monomers or oligomers having functional groups such as acryloyl, methacryloyl, vinyl, and allyl groups. Specifically, examples of such monomers and oligomers that may be used include styrene, tetrahydrofurfuryl acrylate, butyl methacrylate, (α, 2, 3 or 4)-alkylstyrene, (α, 2, 3 or 4)-alkoxystyrene, 3,4-dimethylstyrene, α-phenylstyrene, divinylbenzene, vinylnaphthalene, dimethylamino (meth)acrylate, dimethylaminoethyl (meth)acrylate, dimethylaminopropyl acrylamide, N,N-dimethylaminoethyl acrylate, acryloyl morpholine, N,N-dimethyl acrylamide, N-isopropyl acrylamide, N,N-diethyl acrylamide, methyl (meth) acrylate, ethyl (meth)acrylate, propyl (meth)acrylate, ethylhexyl (meth)acrylate and other alkyl (meth)acrylate, methoxydiethylene glycol (meth)acrylate, (meth)acrylates of diethylene glycol or polyethylene glycol with ethoxy, propoxy or butoxy groups, cyclohexyl (meth)acrylate, benzyl (meth)acrylate, phenoxyethyl (meth)acrylate, isobornyl (meth)acrylate and hydroxyalkyl (meth)acrylates; and other (mono, di, tri, tetra or poly)ethylene glycol di(meth)acrylates in cases where a crosslinked structure is to be introduced in addition to the single function such as fluorine, chlorine or silicon-containing (meth)acrylates, (meth)acrylamide, maleic acid amide, (meth)acrylate; (meth)acrylate such as 1,4-butanediol, 1,5-pentanediol, 1,6-hexanediol, 1,8-octanediol and 1,10-decanediol, trimethylolpropane tri(meth)acrylate, glycerol (di or tri) (meth)acrylate, di(meth)acrylates of ethylene oxide adducts of bisphenol A or F; and an acrylic or methacrylic group-containing compounds such as neopentyl glycol di(meth)acrylate, pentaerythritol tetra(meth)acrylate and dipentaerythritol hexa(meth)acrylate.

The ratio of resin in the ink composition is not particularly limited, but preferably from 0 to 30% by weight, and more preferably from 0 to 20% by weight, per 100% by weight of the ink composition. In addition, in a case where a resin is blended in the ink composition, the amount thereof is preferably set to at least 1% by weight.

In addition, various additives can be contained in the ink composition. Examples of additives can include ultraviolet absorbers, antioxidants, pH adjustors, preservatives, viscosity modifiers, or the like. These may be suitably selected and blended in the ink composition. These additives can be blended within the balance of the 100% by weight of the dispersion and ink composition, aside from the disperse dye and/or pigment, the water and/or water-soluble organic solvent, and the resin, and specifically in a ratio of from 0 to 10% by weight per 100% by weight of the ink composition.

In addition, the method of producing the ink composition is not particularly limited, but it is preferable to adopt a method including obtaining a dispersion by mixing and dispersing the above-described dispersant, disperse dye and/or pigment, and aqueous solvent; and mixing the dispersion with at least one substance selected from the group consisting of water, water-soluble organic solvents, resins, ultraviolet absorbers, antioxidants, pH adjustors, preservatives, and viscosity modifiers.

The ink composition is applied onto a recording medium by an inkjet recording method, a recording method involving the use of a writing implement such as a pen, and some other printing method. It is especially preferable to use the ink composition of the present invention in an inkjet recording method.

EXAMPLES

The present invention will hereinafter be described in detail with reference to Examples and Comparative Examples, but the present invention is not limited thereto. In addition, in the following Examples, "parts" and "%" indicate "parts by weight" and "% by weight", respectively.

Example 1

A plastic vessel (made of polypropylene and having a capacity of 0.5 L) was charged with 15 parts of the red disperse dye DR-60 (C.I. Disperse Red 60), 74.7 parts of ion-exchanged water as an aqueous solvent, and 0.1 part of propylene glycol, 10.0 parts of compound (A-1) as component (A) 0.05 parts of compound (B-1) as component (B), 0.15 parts of compound (C-1) as component (C), and 300 parts of zirconia beads (diameter 0.3 mm), and dispersed for 1 hour, 3 hours and 5 hours using PAINT SHAKER (manufactured by Asada Iron Works, Co. Ltd.). Following dispersing, the zirconia beads were filtered off to obtain a dispersion.

Examples 2 to 18 and Comparative Examples 1 to 11

A dispersion having the composition shown in Tables 1, 2, and 3 were prepared in the same method as in Example 1.

The viscosity, average particle size, and surface tension for each dispersion were measured by the following methods. The results are shown in Tables 1, 2, and 3 below. In addition, in each table, parentheses indicate the amount of active ingredient. The active ingredient of each component which is not described in parentheses is 100%, and each part by weight shows the amount of the active ingredient.

<Viscosity>

The viscosity (at 25° C.) of the dispersion after 1 hour, 3 hours, and 5 hours of dispersion was measured using a TVE-20 E-type viscometer (manufactured by Toki Sangyo Co., Ltd.). It is desirable for the viscosity to be constant even if the dispersion time is long.

<Average Particle Size>

The average particle size (D50) of the disperse dye at each dispersion time was measured as in the viscosity using a concentrated particle size analyzer FPAR-1000 (manufactured by Otsuka Electronics Co., Ltd.).

<Surface Tension>

The static surface tension of the dispersion at each dispersion time was measured as in the viscosity using a DY-500 high-performance surface tensiometer (manufactured by Kyowa Interface Science, Inc.). It is desirable for the static surface tension to be maintainable even if the dispersion time is long.

TABLE 1

| | | Example | | | | | | | |
|---|---|---|---|---|---|---|---|---|---|
| | | 1 | 2 | 3 | 4 | 5 | 6 | 7 | 8 |
| A (pbw) | A-1 | 10.0 | 10.0 | 10.0 | 10.0 | 10.0 | 10.0 | 10.0 | 10.0 |
| | A-2 | | | | | | | | |
| | A-3 | | | | | | | | |
| | A-4 | | | | | | | | |
| | A-5 | | | | | | | | |
| | A-6 | | | | | | | | |
| B (pbw) | B-1 | 0.05 | 0.05 | 0.05 | 0.05 | 0.05 | 0.05 | 0.05 | 0.05 |
| | B-2 | | | | | | | | |
| | B-3 | | | | | | | | |
| C (pbw) | C-1 | 0.15 | 0.15 | 0.15 | 0.15 | 0.15 | | | |
| | C-2 | | | | | | 0.15 | | |
| | C-3 | | | | | | | 0.15 | |
| | C-4 | | | | | | | | 0.15 |
| | C-5 | | | | | | | | |

TABLE 1-continued

|  |  | Example |  |  |  |  |  |  |  |
|---|---|---|---|---|---|---|---|---|---|
|  |  | 1 | 2 | 3 | 4 | 5 | 6 | 7 | 8 |
| Disperse dye (pbw) | DR-60 | 15.0 |  |  |  |  | 15.0 | 15.0 | 15.0 |
|  | DY-54 |  | 15.0 |  |  |  |  |  |  |
|  | DB-359 |  |  | 15.0 |  |  |  |  |  |
|  | DB-360 |  |  |  | 15.0 |  |  |  |  |
|  | DBr-27 |  |  |  |  | 15.0 |  |  |  |
| Aqueous solvent | Propylene glycol | 0.10 | 0.10 | 0.10 | 0.10 | 0.10 | 0.10 | 0.10 | 0.10 |
|  | Water | 74.70 | 74.70 | 74.70 | 74.70 | 74.70 | 74.70 | 74.70 | 74.70 |
| Viscosity (mPa·s) | 1 hour | 4.4 | 4.1 | 4.6 | 4.5 | 4.3 | 4.4 | 4.6 | 4.5 |
|  | 3 hours | 4.5 | 4.2 | 4.7 | 4.5 | 4.1 | 4.3 | 4.8 | 4.7 |
|  | 5 hours | 4.5 | 4.0 | 4.6 | 4.7 | 4.1 | 4.5 | 4.9 | 4.7 |
| Average particle size (nm) | 1 hour | 556 | 763 | 613 | 663 | 503 | 716 | 678 | 412 |
|  | 3 hours | 321 | 543 | 396 | 374 | 364 | 512 | 499 | 299 |
|  | 5 hours | 210 | 275 | 241 | 209 | 247 | 302 | 297 | 187 |
| Surface tension (mN/m) | 1 hour | 38.6 | 38.1 | 39.9 | 40.3 | 41.8 | 39.8 | 39.1 | 40.5 |
|  | 3 hours | 38.9 | 38.6 | 39.8 | 40.7 | 41.3 | 40.3 | 40.3 | 40.9 |
|  | 5 hours | 40.1 | 38.4 | 39.8 | 40.9 | 41.1 | 40.9 | 41.1 | 41.8 |

TABLE 2

|  |  | Example |  |  |  |  |  |  |  |  |  |
|---|---|---|---|---|---|---|---|---|---|---|---|
|  |  | 9 | 10 | 11 | 12 | 13 | 14 | 15 | 16 | 17 | 18 |
| A (pbw) | A-1 | 10.0 | 10.0 | 10.0 |  |  |  |  |  |  | 15.0 |
|  | A-2 |  |  |  | 10.0 |  |  |  |  |  |  |
|  | A-3 |  |  |  |  | 10.0 |  |  |  |  |  |
|  | A-4 |  |  |  |  |  | 40.0 (8.0) |  |  |  |  |
|  | A-5 |  |  |  |  |  |  | 20.0 (8.0) |  |  |  |
|  | A-6 |  |  |  |  |  |  |  | 20.0 (8.0) |  |  |
|  | A-7 |  |  |  |  |  |  |  |  | 1.50 |  |
| B (pbw) | B-1 | 0.05 |  |  | 0.05 | 0.05 | 0.05 | 0.05 | 0.05 | 0.05 | 0.05 |
|  | B-2 |  | 0.08 |  |  |  |  |  |  |  |  |
|  | B-3 |  |  | 0.02 |  |  |  |  |  |  |  |
| C (pbw) | C-1 |  | 0.18 | 0.20 | 0.15 | 0.15 | 0.15 | 0.15 | 0.15 | 0.15 | 0.15 |
|  | C-2 |  |  |  |  |  |  |  |  |  |  |
|  | C-3 |  |  |  |  |  |  |  |  |  |  |
|  | C-4 |  |  |  |  |  |  |  |  |  |  |
|  | C-5 | 0.15 |  |  |  |  |  |  |  |  |  |
| Disperse dye (pbw) | DR-60 | 15.0 | 15.0 | 15.0 | 15.0 | 15.0 | 15.0 | 15.0 | 15.0 | 15.0 | 25.0 |
|  | DY-54 |  |  |  |  |  |  |  |  |  |  |
|  | DB-359 |  |  |  |  |  |  |  |  |  |  |
|  | DB-360 |  |  |  |  |  |  |  |  |  |  |
|  | DBr-27 |  |  |  |  |  |  |  |  |  |  |
| Aqueous solvent | Propylene glycol | 0.10 | 0.10 | 0.10 | 0.10 | 0.10 | 0.10 | 0.10 | 0.10 | 0.10 | 0.10 |
|  | Water | 74.70 | 74.64 | 74.68 | 74.70 | 74.70 | 44.70 | 64.70 | 64.70 | 83.20 | 59.70 |
| Viscosity (mPa·s) | 1 hour | 4.6 | 4.5 | 4.3 | 4.5 | 4.1 | 4.8 | 4.3 | 4.6 | 1.8 | 9.9 |
|  | 3 hours | 4.6 | 4.8 | 4.6 | 4.5 | 4.2 | 4.7 | 4.2 | 4.5 | 1.8 | 9.9 |
|  | 5 hours | 4.6 | 4.6 | 4.5 | 4.6 | 4.3 | 4.7 | 4.2 | 4.4 | 1.8 | 10.2 |
| Average particle size (nm) | 1 hour | 426 | 722 | 778 | 455 | 432 | 698 | 632 | 656 | 660 | 597 |
|  | 3 hours | 287 | 517 | 569 | 301 | 311 | 461 | 399 | 378 | 215 | 301 |
|  | 5 hours | 194 | 298 | 277 | 189 | 191 | 236 | 241 | 263 | 153 | 222 |
| Surface tension (mN/m) | 1 hour | 40.9 | 42.3 | 43.2 | 40.5 | 42.3 | 38.1 | 39.1 | 39.0 | 34.0 | 40.2 |
|  | 3 hours | 40.4 | 43.0 | 44.4 | 41.1 | 42.9 | 38.3 | 39.5 | 39.0 | 34.9 | 40.5 |
|  | 5 hours | 41.6 | 43.1 | 44.9 | 41.2 | 43.0 | 38.6 | 39.9 | 39.6 | 35.5 | 40.9 |

TABLE 3

|  |  | Comparative Example |  |  |  |  |  |  |  |  |  |  |
|---|---|---|---|---|---|---|---|---|---|---|---|---|
|  |  | 1 | 2 | 3 | 4 | 5 | 6 | 7 | 8 | 9 | 10 | 11 |
| A (pbw) | A-1 | 10.0 | 10.0 | 10.0 | 10.0 | 10.0 |  |  |  | 10.0 | 10.0 | 10.0 |
|  | A-2 |  |  |  |  |  | 30.0 (6.0) |  |  |  |  |  |
|  | A-3 |  |  |  |  |  |  |  | 20.0 (8.0) |  |  |  |

TABLE 3-continued

|  |  | Comparative Example | | | | | | | | | | |
|---|---|---|---|---|---|---|---|---|---|---|---|
|  |  | 1 | 2 | 3 | 4 | 5 | 6 | 7 | 8 | 9 | 10 | 11 |
|  | A-4 |  |  |  |  |  |  |  | 20.0 (8.0) |  |  |  |
| B (pbw) | B-1 |  |  |  |  |  |  |  |  | 0.50 |  |  |
|  | B-2 |  |  |  |  |  |  |  |  |  |  | 0.75 |
|  | B-3 |  |  |  |  |  |  |  |  |  |  |  |
| C (pbw) | C-1 |  |  |  |  |  |  |  |  |  | 0.50 | 0.05 |
|  | C-2 |  |  |  |  |  |  |  |  |  |  |  |
|  | C-3 |  |  |  |  |  |  |  |  |  |  |  |
|  | C-4 |  |  |  |  |  |  |  |  |  |  |  |
|  | C-5 |  |  |  |  |  |  |  |  |  |  |  |
| Disperse dye (pbw) | DR-60 | 15.0 |  |  |  |  | 15.0 | 15.0 | 15.0 | 15.0 | 15.0 | 15.0 |
|  | DY-54 |  | 15.0 |  |  |  |  |  |  |  |  |  |
|  | DB-359 |  |  | 15.0 |  |  |  |  |  |  |  |  |
|  | DB-360 |  |  |  | 15.0 |  |  |  |  |  |  |  |
|  | DBr-27 |  |  |  |  | 15.0 |  |  |  |  |  |  |
| Aqueous solvent | Propylene glycol | 0.1 |  |  |  |  |  |  |  |  |  |  |
|  | Water | 74.90 | 75.00 | 75.00 | 75.00 | 75.00 | 55.00 | 65.00 | 65.00 | 74.50 | 74.50 | 74.20 |
| Viscosity (mPa · s) | 1 hour | 4.5 | 4.3 | 4.7 | 4.6 | 4.3 | 4.3 | 4.2 | 4.6 | 4.9 | 4.5 | 4.8 |
|  | 3 hours | 4.6 | 4.2 | 4.7 | 4.6 | 4.3 | 4.1 | 4.2 | 4.5 | 5.0 | 4.6 | 4.8 |
|  | 5 hours | 4.5 | 4.3 | 4.7 | 4.9 | 4.3 | 4.1 | 4.2 | 4.4 | 5.2 | 4.7 | 4.8 |
| Average particle size (nm) | 1 hour | 1,014 | 1,546 | 1,324 | 1,444 | 1,234 | 1,366 | 1,293 | 1,542 | 793 | 687 | 811 |
|  | 3 hours | 743 | 879 | 899 | 917 | 793 | 999 | 893 | 911 | 562 | 482 | 555 |
|  | 5 hours | 598 | 711 | 618 | 643 | 619 | 736 | 687 | 794 | 425 | 350 | 439 |
| Surface tension (mN/m) | 1 hour | 47.9 | 49.9 | 47.6 | 48.9 | 50.1 | 50.9 | 50.0 | 48.7 | 37.9 | 40.1 | 38.9 |
|  | 3 hours | 48.5 | 50.1 | 47.9 | 48.1 | 50.3 | 51.0 | 49.8 | 49.1 | 38.2 | 40.3 | 39.0 |
|  | 5 hours | 49.9 | 50.6 | 47.8 | 47.9 | 50.7 | 51.3 | 50.3 | 49.0 | 38.8 | 40.5 | 39.6 |

In Tables 1 to 3, details of the components (A), (B) and (C) in each table are as follows:

(A-1): sodium lignin sulfonate
(manufactured by West Virginia Pulp & Paper Company, weight average molecular weight: 8,400)

(A-2): sodium lignin sulfonate
(PEARLLEX NP manufactured by Nippon Paper Industries Co., Ltd., weight average molecular weight: 12,000)

(A-3): modified sodium lignin sulfonate
(PEARLLEX DP manufactured by Nippon Paper Industries Co., Ltd., weight average molecular weight: 12,000)

(A-4): SMA-1440
(manufactured by KAWAHARA PETROCHEMICAL CO., LTD., active ingredient: 20%, styrene maleic anhydride copolymer, weight average molecular weight: 7,000)

(A-5): SHALLOL AN-103P
(manufactured by DKS Co. Ltd., active ingredient: 40%, sodium polyacrylate, weight average molecular weight: 10,000)

(A-6): LAVELIN FD-40
(manufactured by DKS Co. Ltd., active ingredient: 40%, a sodium naphthalene sulfonate formalin condensate, weight average molecular weight: 4,000)

(A-7): Noigen EA-137
(manufactured by DKS Co. Ltd., active ingredient: 100%, polyoxyethylene styryl phenyl ether weight average molecular weight: from 850 to 950)

(B-1): 2,5,8,11-tetramethyl-6-dodecyne-5,8-diol ethoxylate
(In formula (2), the average value of m+n=4.)

(B-2): 2,4,7,9-tetramethyl-5-decyne-4,7-diol ethoxylate
(In formula (2), the average value of m+n=4.)

(B-3): 2,4,7,9-tetramethyl-5-decyne-4,7-diol (C-1): In formula (3), w+y=48, weight average molecular weight: 5,250, content of ethylene oxide: 40%, content of propylene oxide: 60%

(C-2): In formula (3), w+y=12, weight average molecular weight: 1,800, content of ethylene oxide: 30%, content of propylene oxide: 70%

(C-3): In formula (3), w+y=26, weight average molecular weight: 2,900, content of ethylene oxide: 40%, content of propylene oxide: 60%

(C-4): In formula (3), w+y=145, weight average molecular weight: 8,000, content of ethylene oxide: 80%, content of propylene oxide: 20%

(C-5): In formula (3), w+y=205, weight average molecular weight: 11,250, content of ethylene oxide: 80%, content of propylene oxide: 20%

(DR-60): C. I. Disperse Red 60

(DY-54): C. I. Disperse Yellow 54

(DB-359): C. I. Disperse Blue 359

(DB-360): C. I. Disperse Blue 360

(DBr-27): C. I. Disperse Brown 27

Japanese Patent Application No. 2018-160358 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An ink composition comprising a dispersion composition, a disperse dye, and an aqueous solvent, the dispersion composition comprising:
   (A) from 85 to 99.89% by weight of a dispersant (except for the following (B) and (C));
   (B) from 0.01 to 5% by weight of an acetylene glycol represented by the following formula (1) and/or an acetylene glycol ethoxylate represented by the following formula (2); and

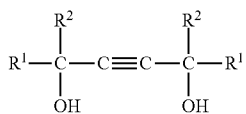

(1)

wherein $R^1$ and $R^2$ each represent an alkyl group having 1 to 5 carbon atoms,

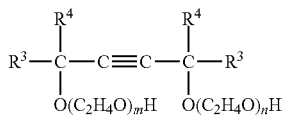

(2)

wherein $R^3$ and $R^4$ each represent an alkyl group having 1 to 5 carbon atoms, m and n are each a positive number of from 0.5 to 25, and m+n is from 1 to 40;

(C) from 0.1 to 10% by weight of one or two or more types selected from polyoxy (ethylene-propylene) block polymers represented by the following formula (3) and having a weight average molecular weight of from 1,500 to 20,000, a content of ethylene oxide of from 20 to 90% by weight, and a content of propylene oxide of from 10 to 80% by weight:

$$HO(C_2H_4O)_w(C_3H_6O)_x(C_2H_4O)_yH \qquad (3)$$

wherein w, x, and y are positive numbers, and wherein said dispersant (A) consists of at least one of: a high molecular weight dispersant having a weight average molecular weight exceeding 1,000; a low molecular weight anionic surfactant having a weight average molecular weight of 1,000 or less; and a low molecular weight nonionic surfactant having a weight average molecular weight of 1,000 or less, the high molecular weight dispersant being selected from the group consisting of methylcellulose, carboxycellulose, hydroxymethylcellulose, lignin sulfonate (Na, K), a formalin condensate-of lignin sulfonate (Na, K), shellac, a styrene-anhydride maleic acid copolymer, an olefin-anhydride maleic copolymer, polystyrene sulfonate (Na, K), an acrylamide-acrylic acid copolymer, sodium alginate, a salt of vinyl naphthalene-maleic acid copolymer (Na, K), a salt of naphthalene sulfonic acid formalin condensate (Na, K), polyalkylene polyamine, polyacrylamide, polyvinyl pyrrolidone, and polyethylene glycol, and wherein the disperse dye is selected from the group consisting of a disperse dye having benzene azo structures, a disperse dye having heterocyclic azo structures, a disperse dye having anthraquinone structures, and a disperse dye having condensed ring structures.

2. The ink composition according to claim 1, wherein the low molecular weight anionic surfactant and the low molecular weight nonionic surfactant have a weight average molecular weight of 100 or more.

3. The ink composition according to claim 1, wherein in (C) the polyoxy (ethylene-propylene) block polymers, the content of ethylene oxide is from 35 to 90% by weight, and the content of propylene oxide is from 10 to 65% by weight.

4. The ink composition according to claim 1, wherein the (C) polyoxy (ethylene-propylene) block polymers have a weight average molecular weight of from 5,000 to 20,000.

5. An ink composition consisting of a dispersion composition, a disperse dye and/or pigment; and an aqueous solvent, the dispersion composition consisting of:

(A) from 85 to 99.89% by weight of a dispersant (except for the following (B) and (C));

(B) from 0.01 to 5% by weight of an acetylene glycol represented by the following formula (1) and/or an acetylene glycol ethoxylate represented by the following formula (2); and

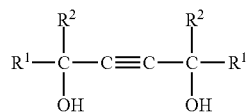

(1)

wherein $R^1$ and $R^2$ each represent an alkyl group having 1 to 5 carbon atoms,

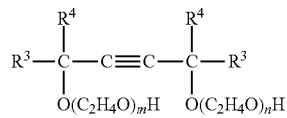

(2)

wherein $R^3$ and $R^4$ each represent an alkyl group having 1 to 5 carbon atoms, m and n are each a positive number of from 0.5 to 25, and m+n is from 1 to 40;

(C) from 0.1 to 10% by weight of one or two or more types selected from polyoxy (ethylene-propylene) block polymers represented by the following formula (3) and having a weight average molecular weight of from 1,500 to 20,000, a content of ethylene oxide of from 20 to 90% by weight, and a content of propylene oxide of from 10 to 80% by weight:

$$HO(C_2H_4O)_w(C_3H_6O)_x(C_2H_4O)_yH \qquad (3)$$

wherein w, x, and y are positive numbers, and wherein said dispersant (A) consists of at least one of: a high molecular weight dispersant having a weight average molecular weight exceeding 1,000; a low molecular weight anionic surfactant having a weight average molecular weight of 1,000 or less; and a low molecular weight nonionic surfactant having a weight average molecular weight of 1,000 or less, the high molecular weight dispersant being selected from the group consisting of methylcellulose, carboxycellulose, hydroxymethylcellulose, lignin sulfonate (Na, K), a formalin condensate-of lignin sulfonate (Na, K), shellac, a styrene-anhydride maleic acid copolymer, an olefin-anhydride maleic copolymer, polystyrene sulfonate (Na, K), an acrylamide-acrylic acid copolymer, sodium alginate, a salt of styrene-acrylic acid copolymer (Na, K), a salt of vinyl naphthalene-maleic acid copolymer (Na, K), a salt of naphthalene sulfonic acid formalin condensate (Na, K), polyalkylene polyamine, polyacrylamide, polyvinyl pyrrolidone, and polyethylene glycol, and wherein the disperse dye is selected from the group consisting of a disperse dye having benzene azo structures, a disperse dye having heterocyclic azo structures, a disperse dye having anthraquinone structures, and a disperse dye having condensed ring structures.

* * * * *